United States Patent [19]
Zaiken et al.

[11] Patent Number: 5,907,848
[45] Date of Patent: May 25, 1999

[54] METHOD AND SYSTEM FOR DEFINING TRANSACTIONS FROM A DATABASE LOG

[75] Inventors: Kenneth A. Zaiken, Rochester, Minn.; Guy Dehond, Hoboken-Antwerp, Belgium; Dan Boggs, Chicago, Ill.

[73] Assignee: Lakeview Technology, Inc., Oak Brook, Ill.

[21] Appl. No.: 08/818,513

[22] Filed: Mar. 14, 1997

[51] Int. Cl.$^6$ ................................... G06F 17/30
[52] U.S. Cl. .................. 707/202; 707/1; 707/2; 707/8; 707/10; 707/101; 707/103; 707/201; 707/203; 707/204; 707/205; 705/4
[58] Field of Search ............... 707/1, 2, 8, 10, 707/101, 103, 201, 202, 203, 204, 205, 6, 9, 206; 705/4, 40; 711/152, 168, 113, 1–7, 9; 370/231; 701/2; 1/1

[56] References Cited

U.S. PATENT DOCUMENTS

| | | | |
|---|---|---|---|
| 5,193,162 | 3/1993 | Bordsen | 711/152 |
| 5,303,368 | 4/1994 | Kotaki | 707/8 |
| 5,680,614 | 10/1997 | Bakuya | 107/103 |
| 5,704,044 | 12/1997 | Tarter | 705/4 |
| 5,712,987 | 1/1998 | Waits | 1/1 |
| 5,729,594 | 3/1998 | Klingman | 379/93.12 |
| 5,734,883 | 3/1998 | Umen | 1/1 |

Primary Examiner—Thomas G. Black
Assistant Examiner—Diane D. Mizrahi
Attorney, Agent, or Firm—Baker & McKenzie

[57] ABSTRACT

A method and system of providing external transaction protection for a database using the database log or journal. The method involves creating a set of transaction templates which define transactions, using the templates to determine whether each record or entry in the journal represent part of a transaction, and maintaining a set of index file indicating transactions in progress. Each transaction template contains a number of filenames identifying files in the database affected during the transaction defined by the template. Each template also contains a key value representing one or more data fields in the database included in every action performed during the transaction. For each entry in the journal, a determination is made whether the entry belongs to a transaction based on the data fields represented in the entry and the key values associated with the templates. The index files are maintained by creating a new index file for each new transaction, adding data to a given index file from a journal entry which belongs to the transaction associated with the given index file, and deleting index files when transactions with which they are associated are complete. In the event the database is damaged, existing index files are used to determine which transactions did not complete before the database was damaged. The actions which were completed may be rolled back.

28 Claims, 8 Drawing Sheets

| LSN | TRANSACTION ID | JOB ID | ACTION | FILENAME | BEFORE IMAGE | AFTER IMAGE |
|---|---|---|---|---|---|---|
| 001 | 1 | J1 | START | | | |
| 002 | 1 | J1 | UPDATE | F1 | (OLD VALUE) | (UPDATED VALUE) |
| 003 | 2 | J2 | START | | | |
| 004 | 2 | J2 | INSERT | F3 | | (VALUE) |
| 005 | 1 | J1 | UPDATE | F2 | (OLD VALUE) | (UPDATED VALUE) |
| 006 | 3 | J1 | START | | | |
| 007 | 1 | J1 | COMMIT | | | |
| 008 | 3 | J1 | DELETE | F4 | (OLD VALUE) | |
| 009 | 2 | J2 | ABORT | | | |

FIG. 1

| LSN | JOB ID | ACTION | FILENAME | BEFORE IMAGE | AFTER IMAGE |
|---|---|---|---|---|---|
| 001 | J1 | UPDATE | F1 | (OLD VALUE) | (UPDATED VALUE) |
| 002 | J2 | INSERT | F3 | | (VALUE) |
| 003 | J1 | UPDATE | F2 | (OLD VALUE) | (UPDATED VALUE) |
| 004 | J1 | DELETE | F4 | (OLD VALUE) | |

FIG. 2

```
RCDNBR      *...+....1....+....2....+....3....+....4....+....5....+....6....+....7....+....8....+....9....+....0
                                        ⌠42⌠            ⌠44⌠          ⌠46⌠            ⌠48⌠        ⌠50⌠          ⌠52⌠
     1     0075200000000258RPT1996-12-05-13.09.12.315904QPADEV0003ZAIKEN      DEVELOP   1 /6  00  3910590CMD       0        0
          ⌠──────⌠                                                                     ⌠──────────────⌠      ⌠──────────⌠
           PERFSIZE2 000000002300000000000000ZAIKEN          PERFSIZE3 *FILE         PF          PERFSIZE2  ZAIKEN
          ⌠───⌠                      ⌠56                                                                  i?Output file for DSP
           OBJD ⌠54                    3012059613091ZZAIKEN
```

FIG. 4

METHOD AND SYSTEM FOR DEFINING TRANSACTIONS FROM A DATABASE LOG

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to database recovery systems. More particularly, the present invention relates to a method and system for defining transactions based on a database log, keeping track externally to the log of transactions in progress at any one time, and recovering from system failures by at least undoing any actions performed on the database as part of transactions which were in progress at the time of system failure.

Database recovery is an important function of a database system. Data in a database can be lost or damaged due to various types of failures, including physical disasters (fires, floods, etc.), computer system crashes, software or human error, and physical failures in the media upon which the database is stored. To prepare for such failures, a backup copy of the database is usually stored on a secondary media, and the backup copy is periodically updated to match the database. Also, a log or journal is maintained which keeps track of changes made to the database, and the log is used in the event of loss or damage to the database to reproduce the changes made to the database since an earlier backup.

Another important feature of database systems is transaction protection. A transaction is generally a logical unit of work which comprises a set of actions forming a single logical operation. As a typical example, a transfer of money from one account to another account is a transaction which involves several discrete actions in a database—deleting the amount of money from a file representing the first account, adding the amount to another file representing the second account, and possibly updating other files such as files representing bank accounting records regarding the amounts of total funds in the bank's various types of accounts. If any one of these actions were performed without the others, the database would be inconsistent and would contain erroneous data. Therefore, the database system must have the capability to perform either all the actions or none of them, thus protecting the integrity of the transaction and the database.

A mechanism used to protect transactions is embedded commitment control. An application program or agent inserts special command lines in the database log which identify transactions and indicate the start and end of each transaction. For example, in certain database applications, such as applications based on Structured Query Language ("SQL"), a "START" statement or the like is inserted in the log at the beginning of a transaction and either a "COMMIT" or similar statement or "ABORT" (or "ROLLBACK") statement is inserted in the log at the end of the transaction, depending upon whether the transaction is to be committed (performed in the database) or aborted (not performed). The START, COMMIT and ABORT statements may be part of an SQL program embedded in an application program or may be inserted by the database manager system under certain conditions, for example, when a program completes successfully (COMMIT) or aborts prior to completion (ROLLBACK). Database management systems vary in the extent to which explicit transaction-related statements may be included in SQL programs or in which only external transaction control is available through external agents or transaction managers.

During database recovery, the recovery program scrolls through the log looking for records having the START and COMIT/ABORT statements. For each completed transaction having START and COMMIT statements, the program retrieves the records in-between associated with the transaction and performs a redo or roll forward by updating the database with the actions in the transaction if such actions have not already been performed in the database. For incomplete transactions having a START statement with no COMMIT, or for transactions ending with an ABORT, the actions in the transaction are undone or rolled back if they had already been performed in the database. The use of checkpoints in the log helps identify which actions have been performed in the database.

A simplified example of a portion of one type of existing database log having embedded commitment control is shown in FIG. 1. This example is used to illustrate the general operation of and problems associated with existing systems and does not necessarily represent an actual database log.

Among other possible data stored in the log, such as times and user login information, each record in the log stores a log sequence number ("LSN") which uniquely identifies each record, a Transaction ID which uniquely identifies each transaction, a Job ID which uniquely identifies the source of each job performed on the database (e.g., teller number, ATM number, etc.), and an Action to be performed, such as FETCH, UPDATE, INSERT, DELETE, etc. Some of these simplified fields may actually consist of a number of fields, e.g., the simplified Job ID field may actually consist of Job Name, User Name, and Job Number fields. Actions also include START, COMMIT, and ABORT statements which provide transaction protection as explained above and are used by the transaction management system. The START, COMMIT and ABORT statements may be inserted in the database and log by the application program or may be provided by the database management program. For Actions other than those related to transaction protection, additional information is stored including a filename of the file affected by the action and before and/or after images of the data representing the change to the data in the database.

If the log section shown in FIG. 1 is available after a system failure, the recovery program can identify that transaction 1 was completed because it has START and COMMIT statements (at LSN=001 and LSN=007), that transaction 2 was aborted, and that transaction 3 is incomplete because it has no COMMIT or ABORT statement. Thus, if all these actions were performed on the database before system failure, the recovery program allows the actions in transaction 1 to stand and rolls back the actions performed in transactions 2 and 3.

Another aspect of transaction protection is locking. Once a transaction has started, no other action should be performed on the files involved in the transaction until the transaction is completed or aborted, or else the database could become inconsistent. START, COMMIT, and ABORT statements can be used to determine when and which files are locked. For example, in the log section shown in FIG. 1, filename F1 would be locked until transaction 1 is committed or aborted.

A problem with existing transaction protection schemes is that an embedded agent or application program is required in the database managing program to dictate to the database the boundaries of a transaction and to insert the START and COMMIT/ABORT statements in the database log. However, if an application program does not contain such embedded logic, the database will not have fault tolerant transaction processing. For example, the simplified log section in FIG. 2 is similar to the log section in FIG. 1 except for the absence of a Transaction ID field and any statements defining the start or end of transactions. Alternatively, the Transaction ID may be present but filled with null or zero entries because of the absence of transaction control.

As a result, a recovery program could not by itself determine which actions constitute transactions and thus could not protect the transactions. For example, in FIG. 2 the recovery program would be unable to determine whether the log record identified by LSN=4 forms part of the same transaction as the record identified by LSN=3, forms part of a new transaction, or does not form part of a transaction at all.

Furthermore, application programs lacking embedded commitment control may also be unable to lock database files properly, resulting in the use and storage of inconsistent or incorrect data, as explained above.

Because the boundaries of transactions vary depending upon the application, the development of embedded commitment control requires particular knowledge of the type of work performed by the application and the nature of the business in which the application program is used. The development of commitment control can thus be expensive and labor intensive. In addition, a change in the boundaries of a transaction due, for example, to a change in the way work is performed, would require a change in the commitment control logic.

Another drawback of existing transaction protection schemes is that many of them require the recovery program to scroll through an entire log, which may be quite time consuming, in order to find the transactions and either redo the completed transactions or undo the incomplete or aborted transactions.

There is thus a need for a method for defining transactions in the absence of commitment control and for a method for protecting transactions during database recovery using logs generated by programs lacking embedded logic for setting transaction boundaries. The present invention provides these and other advantageous functions.

SUMMARY OF THE INVENTION

It is an object of the present invention to substantially solve the problems described above relating to database logs.

It is another object of the present invention to provide transaction protection for a database which does not have commitment control.

It is another object of the present invention to define transactions based on a database log.

It is another object of the invention to heuristically determine transaction boundaries.

The above and other objects of the present invention are achieved by a method of defining transactions from a log of a database, the log comprising data relating to changes to the database, the log data being stored in a plurality of records each having a plurality of fields. The method involves, for each of a plurality of records in the log, determining whether the record relates to a transaction included in a transaction template, and for each record that relates to a transaction included in the template, determining whether the record relates to a new transaction or an incomplete transaction.

For each record relating to a new transaction, an indicator, such as a separate index file or separate entry within a file containing a number of indicators, is created and stored for the transaction, and information relating to the record is inserted into the indicator. For each log record relating to an incomplete transaction, a determination is made whether the record represents the end of the incomplete transaction and, if the record does not represent the end of the incomplete transaction, information relating to the record is inserted into the previously created indicator for the incomplete transaction.

In preferred embodiments, a plurality of transaction templates are stored and one of the plurality of templates is selected based on at least part of the data stored in the record. In these embodiments, each template may be assigned a key value based on one or more data fields from the database. This key value represents data fields which are accessed during each action performed in the transaction and as such represents a signature for the transaction. The data stored in the record includes data values from data fields in the database, and templates are selected by selecting a template having a key value which matches one or more of the data fields whose data values are in the record.

When the log records include a filename field identifying a database file affected by a change, the template may include a plurality of filenames representing files changed during a transaction. A determination as to whether each record relates to a transaction included in the template may then comprise determining whether the filename stored in the record matches a filename in the template.

In preferred embodiments, the indicators are deleted after the end of the transaction represented by the indicator. Thus, the presence of an indicator can generally be considered to indicate that the transaction represented by the indicator is ongoing and incomplete. When the indicators are so deleted, the step of determining whether each record relates to a new transaction or an incomplete transaction may involve searching for an indicator containing data which matches data stored in the record, the failure to find such an indicator being an indication that the record relates to a new transaction.

When the log records contain unique job identifier data, and the job identifier data is inserted from records into indicators, a particular indicator may be found by searching for an indicator containing job identifier data which matches the job identifier data stored in the record.

When the log records include data values from data fields in the database, the data fields being used as key values for the templates as mentioned above, these key values may be inserted into the indicators. The determination as to whether a given record relates to a new transaction or an incomplete transaction may involve comparing the key value in the given record to a key value stored in the indicator found in the search, the mismatch of key values being an indication that the record relates to a new transaction. This determination may also involve comparing the filename in the record to a filename stored in the indicator found in the search, the match of filenames being an indication that the record relates to a new transaction.

In the event data is lost from or damaged in the database, the indicators can be used to recover the lost or damaged data. In preferred embodiments, indicators are deleted when the record represents the end of a transaction, and the indicators are used to recover lost or damaged data by identifying incomplete transactions based on the indicators and undoing any changes stored in records relating to incomplete transactions. The records can be identified in the indicators by the use of pointers or the sequence numbers associated with the records in the log.

BRIEF DESCRIPTION OF THE DRAWINGS

The invention is illustrated in the figures of the accompanying drawings which are meant to be exemplary and not limiting, in which like references refer to like or corresponding parts, and in which:

FIG. 1 is a simplified example of a log section produced by a database program having embedded transaction protection;

FIG. 2 is a simplified example of a log section produced by a database program lacking embedded transaction protection;

FIG. 4 is a sample log record produced by a DB2/400 database management system;

DETAILED DESCRIPTION OF THE PREFERRED EMBODIMENTS

Figure 3:
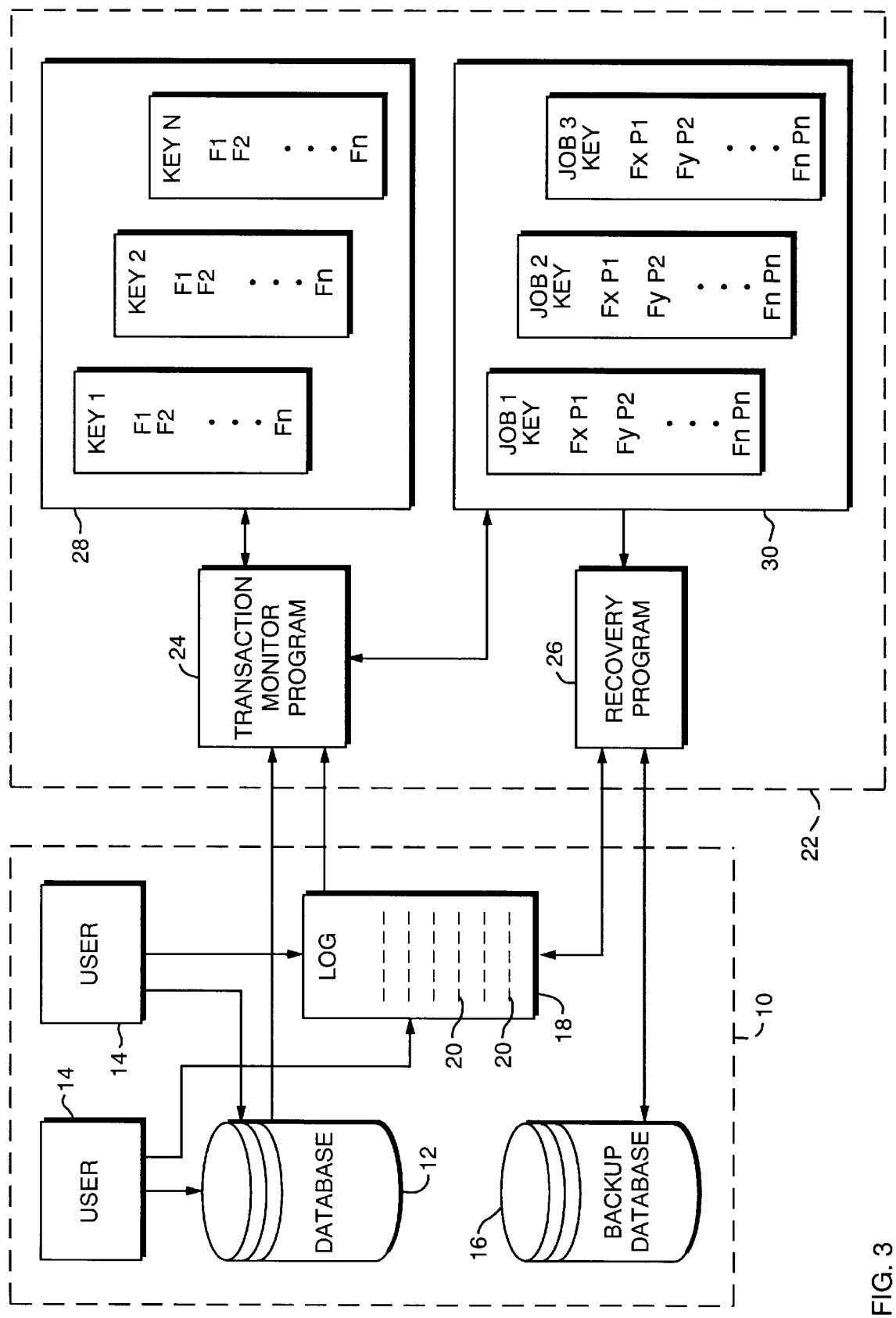
FIG. 3 is a block diagram of a system incorporating a transaction protection system in accordance with one embodiment of the present invention.

Preferred embodiments of the invention are described herein with reference to the system block diagram contained in FIG. 3, the sample log entry shown in FIG. 4, and the flow charts shown in FIGS. 5A–5B, 6A–6B, and 7.

With reference to the block diagram in FIG. 3, a database system 10 contains a currently active database 12 which is operated upon by a number of users 14 and a backup database 16 which is stored in a secure location, contains an earlier version of the data in the database 12, and is periodically updated. The database 12 may be a relational database such as DB2 in which the data stored in the database 12 is perceived in the form of tables or files identified by table names or filenames and having groups or sets of data values each of which is identified by a name and contains data values of a certain data type. Each file contains a number of records or entries, each record containing a number of fields each having a data value from one of the groups. The structures of databases and the operation of database management systems are well known in the art and need not be described in detail herein.

The database system 10 maintains a log 18. The log 18 contains a number of records or entries 20 which are continuously added to the log 18 while the database 12 is modified by the users 14. The actions of the users 14 can be performed immediately on a copy of the database 12 and each action simultaneously reflected in a record 20 stored in the log 18. Alternatively, the actions can be recorded only in the log 18 to be performed on the database 12 at regular intervals or checkpoints as is well known in the art.

In accordance with the invention, a transaction defining system 22 is linked with the database system 10, either by being stored on the same computer system or being connected via network or communication link. The transaction defining system 22 comprises a number of programs or routines including a transaction monitor program 24 and a recovery program 26. The programs are stored on computer usable media such as floppy or hard disk, CD-ROM, or other conventional storage medium, in separate files or as separate routines within a single program, and transferred to a volatile memory device such as RAM or cache when used. The transaction defining system 22 also includes a number of transaction templates 28 created by the transaction monitor program 24, and a number of index files 30 produced by the transaction monitor program 24.

In accordance with procedures described in more detail below, the transaction monitor program 24 operating in a LEARN mode creates templates 28. The templates 28 each contain a key value and a list of filenames up to a maximum number which represent database files produced during or affected by one or more transactions. The templates define the database files which are potentially involved in a transaction—each template may in fact represent multiple transactions, especially transactions which are similar or related. The use of the key value and job identifier data, as explained further below, helps to more particularly associate log records with actual transactions in progress.

The key value in the template is used, when the transaction monitor program is operating in a MONITOR mode, to determine whether each log record 20 belongs to a transaction and to select one of the templates 28 based on data contained in the log record 20. To facilitate selection of the template 28, the key value may be incorporated into the name of the template 28. The list of filenames in the template 28 is used to determine, based on the filename specified in each record 20, whether the record relates to a transaction defined by the template.

For each record 20 which is found to constitute part of a transaction, the transaction identifier program 24 keeps track of whether the record 20 represents the start of a new transaction, part of an incomplete or ongoing transaction, or the end of a transaction by creating, modifying, and deleting, respectively, index files 30. Each index file 30 contains job identifier data, a key value, one or more filenames, and one or more pointers to log records 20.

As described further below, the job identifier data is used to determine for each record which has been determined based on the templates 28 to belong to a transaction whether the transaction is already in progress or whether the record 20 represents a new transaction. If a transaction is already in progress, the key value and filenames in the index file 30 are used to determine whether the record represents another part of the transaction or whether the transaction is complete and the record 20 represents the start of a new transaction. The filenames in the index file 30 are also used to determine whether a transaction is complete based on the selected template 28. The pointers, which in one embodiment are the LSNs for the records marked in the index file 30, are used by the recovery program 26 to locate in the log 18 each record 20 pointed to in the index file 30.

In the event of a system failure requiring data recovery, the recovery program 26 determines which transactions are incomplete based on the existence of the index files 30 identifying log records 20 belonging to the transaction.

The database system 10, transaction defining system 22, and particular elements thereof may be stored on a single mainframe or microcomputer system or on separate computer systems connected over a local network or remotely via a telecommunications link. The present invention has particular applicability to database systems operating on IBM's AS/400 environment, because many of such systems, including several versions of DB2, lack embedded commitment control and produce logs lacking transaction definitions. One skilled in the art will recognize that the present invention may be used on any database or other type of computer system, including any system that includes embedded commitment control.

A sample log record produced on an IBM AS/400 mainframe using facilities associated with a DB2/400 database is shown in FIG. 4. The record, which represents the type of record used in one embodiment of the invention, contains a number of fixed length fields which have been visually separated for convenience by the use of separate underlining in the Figure. The record also contains data values (non-underlined) which relate to data from the database record affected by the action. In addition, an offset ruler is provided above the log record to facilitate location of fields by their offset from the start of the record. The name of and type of data stored in each fixed length field can be obtained by reference to Field Description tables available from IBM Corp. However, a few specific fields will be discussed herein to provide a more complete understanding of the operation of the invention.

A sequence number field 40 (offsets 6–15) contains the log sequence number which is assigned to each record or entry. The sequence numbers generally increment until reset. A time stamp field 42 (offsets 19–44) contains the system date and time at which the record was added to the log.

A job name field 44 (offsets 45–54), user name field 46 (offsets 55–64) and job number field 48 (offsets 65–70) contain, respectively, the name of the job that performed the action which resulted in the record, the name of the user that started the job, and the job number associated with the user. One or more of these fields are used as job identifier data by the transaction monitor program, as explained in more detail below. In preferred embodiments, all three fields are used as the job identifier data to ensure that the job identifier data is unique.

The sample log record also contains an object name field 50 (offsets 81–90), library name field 52 (offsets 91–100) and member name field 54 (offsets 101–110) which contain, respectively, the name of the database object for which the record was added, the name of the library containing the object, and the name of the physical file if the object is a file. One or more of these fields are used by the transaction monitor program as the filename relating to the record, which filename is then stored in both the template defining the transaction which uses or produces the object or file and in the index file associated with the record.

The record also contains a commit cycle identifier field 56 (offsets 122–131). This field contains a number that identifies a commit cycle, which runs from one commit or abort instruction to the next. This field is used when commitment control is available. If the record is not part of a transaction or commitment control is unavailable, this field contains all zeros.

In accordance with embodiments of the invention, the transaction monitor program is operable is several modes. In LEARN mode, the program creates new transaction templates. In MONITOR mode, the program monitors a log using existing templates. In RECOVER mode, the program performs recovery operations for the database, and thus functions as the recovery program 26. Details regarding these operations of the transaction monitor program and the transaction defining system in general are described below with reference to the flow charts in FIGS. 5A–5B, 6A–6B, and 7.

The transaction monitor program 22, operating in LEARN mode, creates a new transaction template 28 by interrogating an existing or prior log 18, specified by name or other identifier, and heuristically determining the actions performed in the transaction based on patterns in the log data. The basis for this heuristic determination is that one or more of the fields used in each action performed during the transaction will be identical, and thus this field or fields can be used as a basis for labeling the transaction. The field or fields which are common to each transaction are identified by storing the data values for all data fields in a number of records and comparing the data values from a given record to corresponding fields in other records.

An example will help illustrate this heuristic determination process. A company selling goods maintains a database which includes numerous files such as an inventory file, a distribution file, and a customer master file. Each file has a number of fields which store information relating to the purpose of the file. For example, the inventory file has data fields such as date, part number (representing particular items sold by the company), quantity (representing the number of each item available in stock), warehouse number (representing where the items are stored), etc.

When a customer places an order for an item, the inventory file is updated to reflect a change in the number of items available in stock, and a log record is inserted into the log. The data in the fields affected by the action, including date, part number, quantity, and warehouse number, are contained in the log record. For the quantity, the log record stores the number subtracted from the total quantity in inventory as a result of the order, i.e., the number ordered. The distribution file is also updated to reflect the shipping arrangements made for the item. The fields affected by the change, such as date of order, part number to be shipped, quantity to be shipped, date of delivery, and trucker ID, are contained in another log record. The customer master file is also changed to reflect the order. Customer file fields which are changed, such as customer number, date of order, part number ordered, quantity ordered, and price, are stored in a third log record. All three actions on the database represent a single transaction, here an order, and are performed by the same user during the same job. The performance of any action without the others would result in inconsistent data in the database.

A comparison of the fields affected by all three updates shows that the part number and quantity fields are affected in all three files. Thus, these two fields can be used as a key to identify an order. The date field should be ignored because date stamps which are accurate to the second or fraction thereof would never match up in different records and date stamps which are less accurate would be common to different transactions performed at about the same time. The fact that the quantity and part number fields represent the key for this transaction can be determined by comparing the actual data values contained in the three log records. In all three records, the part number and quantity data is identical, indicating that these fields are affected in all three actions. The fact that all three records may relate to the same transaction can be determined by reference to the user/job data.

With this framework in place, the steps performed by one embodiment of the monitor program 22 to create a new template are described with reference to the flow chart in FIGS. 5A–5B. First, a user specifies a template ID for the template to be created and job identifier data for a specific job to be monitored, step 60. Although the log likely contains consecutive records relating to actions performed by different users for different jobs, a particular user performing a particular job does not begin a new transaction in the middle of a previous, incomplete transaction. Thus, specifying particular job identifier data to be monitored during template creation facilitates the location of the start and end of a transaction performed by that job identifier data. After the template is created, another job identifier may be specified to create another template. In other embodiments, multiple jobs may be specified and the transaction monitor program keeps track separately of actions performed relating to each job.

Once the log, template and job identifier data are specified, the log is opened and log records retrieved one at a time, step 62. Each log record is checked to determine whether it contains the specified job identifier data, step 64. If the record does not contain the specified job identifier data, the record is skipped and the next record retrieved. If the record relates to the job, the data values from the record which relate to data from the database are retrieved, step 66. In the sample DB2/400 log record shown in FIG. 4, this data is stored in the non-fixed length field at the end of the record.

The template ID specified by the user is then compared to the IDs for any existing templates, step 68. If the specified template ID does not match any existing template IDs, indicating that the template will be new, the data values retrieved from the log record are compared to any data values previously retrieved from other log records having the same job identifier data, step 70. If the current log record represents the first record retrieved from the log during a given LEARN session, then no other data values will have been previously retrieved and the data values are stored to be used for comparison to subsequently retrieved records. If other data values have been stored, the data values from the currently retrieved log record are compared to each of the previously retrieved data values, step 72. If no data values match, then the data values from the retrieved log record are stored, step 74, and the next log record is retrieved, step 62.

If one or more data values from the currently retrieved log record match data values from previously retrieved log records, the field names relating to the matching data values are retrieved from the database, step 76 (FIG. 5B), and a key value is created from these data field names, step 78. As explained above, in a well designed database, field names contained in different files but storing the same type of data will have the identical field names. In that case, the key value consists of the field names. In the event corresponding fields from different files have different field names, the key value reflects both field names and associates them as representing the same data.

A new template is created, step 80 and assigned the specified template ID. In one preferred embodiment, templates are separate files having the template ID as the filename. Alternatively, templates may be separate objects within a single file. The key value is associated with the template, such as by being stored in the template or being used in the template filename. The filename stored in the log record is retrieved from the record and inserted into the template, step 82. Thus, the action performed by the record is registered as part of a transaction defined by the template. The next record is then retrieved, step 62.

Returning to step 68 (FIG. 5A) at which a determination is made whether a template already exists having the specified template ID, the existence of such a template indicates that a template has been created, perhaps in a previous iteration during the same session using the same job identifier data. If such a template does exist, the program determines whether the currently retrieved log record represents a further action in the transaction or not part of the transaction. To make this determination, the program retrieves data fields from the database which correspond to the data values stored in the log record, step 84. The data fields are compared to the key value for the template having the specified template ID, step 86. If none of the data fields match the key value, then the transaction template is complete because the job identifier is now performing an action that belongs to another transaction or does not belong to any transaction. If the database is not well designed by having identical field names for fields storing the same type of data, additional steps will be necessary to compare the data values stored in the record with any previously stored data values substantially according to the process described above.

If some of the data fields in the currently retrieved log record match the key value, the program retrieves the filename from the log record, step 88. The filename is compared to the filenames already represented in the template, step 90. If the filename from the log record does not match a filename in the template, the filename is added to the template, step 94, and the next record is retrieved, step 62. If the filename from the log record does match a filename already represented in the template, and if the user has specified that duplicate filenames are not allowed in a transaction (because all actions to be performed on a file would be performed in a single step and stored in a single record), step 92, this serves as an indication that the job has begun a new transaction, and the transaction is considered complete and the template is closed.

If duplicate filenames are allowed in the same template, the filename is added to the template, step 94, and the next record retrieved, step 62. A maximum number may be set for duplicate filenames, and additional steps may be performed to check whether the maximum has been reached, in which case the template is complete.

The process of creating a new template may continue, even after a template is considered complete, to serve as a check on the accuracy of the template. That is, the program may continue looking for additional log records having the specified job identifier data and comparing the data fields and filenames represented in those records with those in the template. A match of the key values and filenames in the template to key values and filenames in the additional records helps to confirm that the information in the template accurately represents a transaction. A user may specify the number of iterations to be made to reach a desired comfort level of accuracy.

Figure 5A:
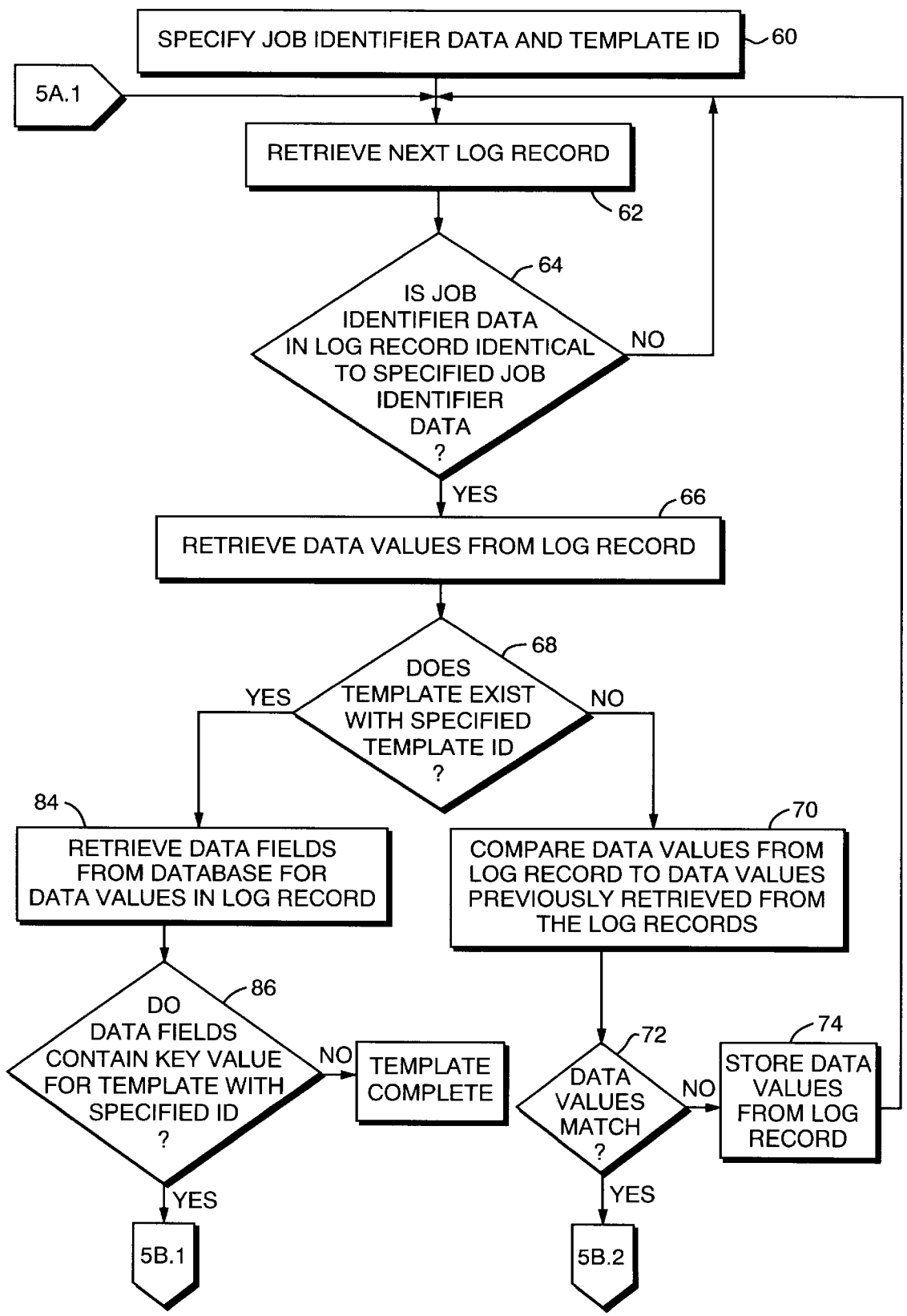
FIGS. 5A and 5B contain a flow chart showing the process of creating a new transaction template in accordance with one embodiment of the present invention.
Figure 5B:
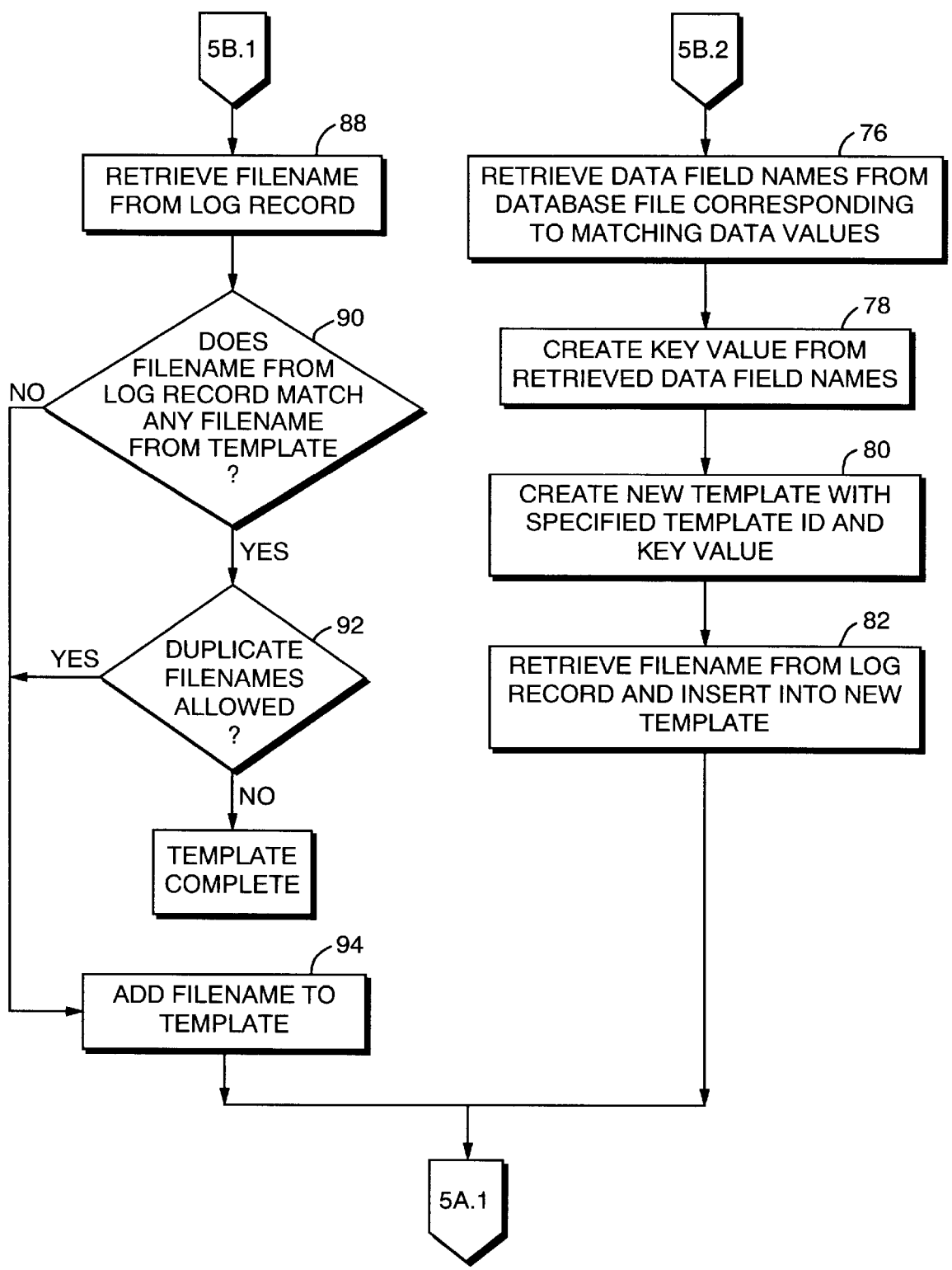

As shown in FIGS. 5A–5B, the process of creating a new template will continue until the template is considered complete because the job began working on a different transaction (based on the presence of a new key value or a repeated filename). Alternatively, the user may opt for the program to terminate a session in the event a template is not complete before the expiration of a specified time limit.

By repeating this process for different template IDs and different job identifiers, a large number of templates may be created each representing one or more different transactions. A utility program may be provided as part of the transaction defining system which allows a user to bring up an interactive display which lists all or specified templates that have been defined by the monitoring program. From this display, the utility provides the functionality, at the user's option, to (1) display a template by displaying the files associated with the template for transaction definition, and the unique key needed to define the transaction template;
(2) change a template by allowing the user to modify the files within the template or change the unique key needed;
(3) delete a template; and
(4) rename or move a template.

These functions allow users the flexibility to adjust the transaction definitions as represented by the templates.

Figure 6A:
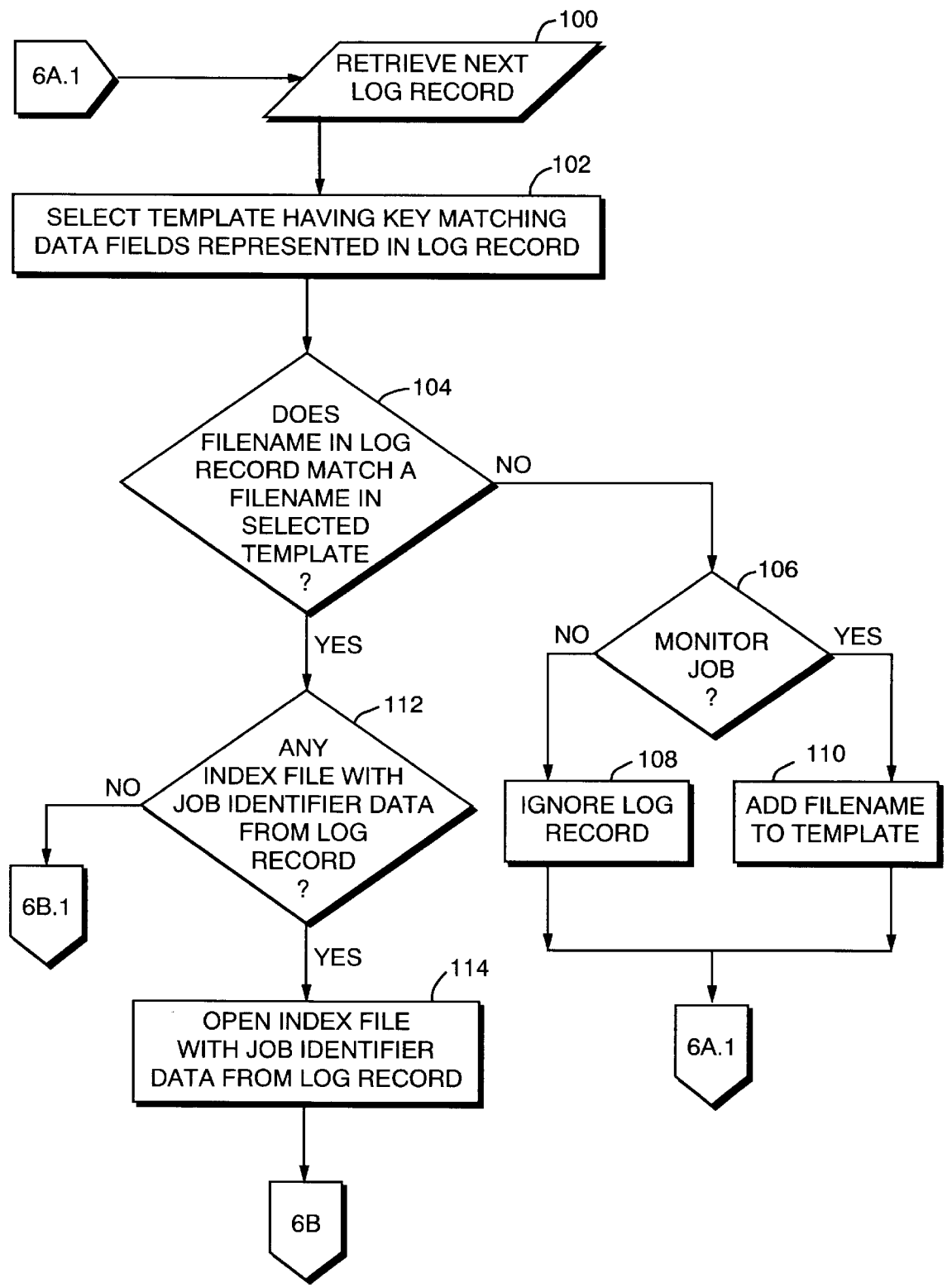
FIGS. 6A and 6B contain a flow chart showing the process of defining transactions in accordance with one embodiment of the present invention.
Figure 6B:
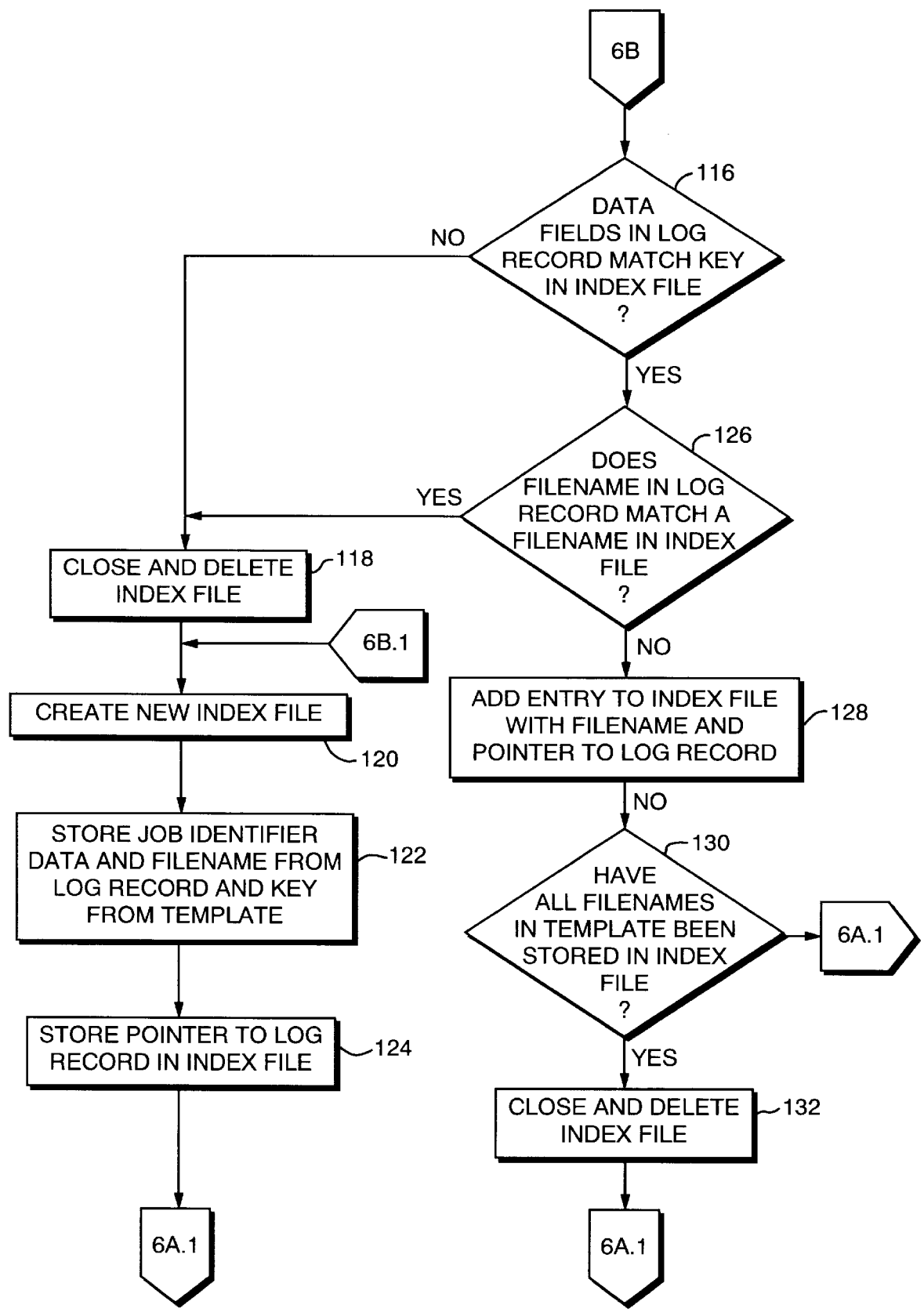

Referring to FIGS. 6A–6B, the transaction monitor program 24, operating in MONITOR mode, keeps track of transactions as follows. Each log record 20 is retrieved, step 100, either immediately upon being written into the log 18 or at some later point. In preferred embodiment, the records are retrieved on a real-time basis so that the monitor process is up-to-date in the event recovery becomes necessary.

The set of templates 28 are searched to locate a template 28 having a key value equal to one or more of the data fields represented in the log record 20, step 102. The filename in the record 20 is then compared with the filenames in the selected template 28, step 104. If the filename in the record 20 is not matched by any filenames in the selected template 28, this is an indication that the record is not part of the transaction as currently defined by the template. Alternatively, the transaction monitor program may be placed in a mode by which, during normal log monitor operation, it monitors records for updating all templates or only specific templates or jobs. If such mode is not in operation, step 106, the record is ignored, 108, because it contains an action which is not performed as part of the transaction defined by the template. If such mode is in operation, the filename is added to the template 28, step 110, so that the next time the filename is encountered in a subsequent record it will be considered part of a transaction. In this way templates can be modified even during normal log monitor operation. In either case the next record is retrieved from the log, step 100.

If the filename in the record 20 matches a filename in the selected template 28, the transaction monitor program then searches for any existing index files 30 having job identifier data equal to the job identifier data in the record 20, step 112. If no such index file 30 exists, an index file 30 is created, step 120, the job identifier data and filename from the record 20 and the key value from the template are stored in the index file, step 122, and a pointer to the record, such as the sequence number, is stored in the index file 30, step 124. The next record is then retrieved, step 100, and the process repeated. The creation of an index file 30 "starts" a new transaction by marking a new transaction as having started at this point in the log 18.

If an index file 30 exists having job identifier data matching the job identifier data in the record 20, the index file is opened, step 114. The data fields corresponding to the data values stored in the record 20 are then compared to the key value stored in the open index file 30, step 116. If the key values do not match, then the index file is closed and deleted, step 118, because the transaction represented by the index file 30 has ended and a new transaction begun. This condition is satisfied because, as explained above, a user/job performs one transaction at a time and does not start a new transaction for a key value (i.e., another transaction), while that same user/job already has a transaction in progress for another key value.

After deleting the existing index file 30 having the matching job identifier data, the transaction monitor program creates a new index file 30, step 120, stores the job identifier data, filename, and key value in the new index file 30, step 122, and stores a pointer to the record 20, step 124. The next record is then retrieved, step 100, and the process continued.

If the key value in the index file 30 matches data fields represented in the record 20, the transaction monitor program 24 then compares the filename in the record 20 to the filename(s) stored in the index file 30, step 126. If the filenames match, and duplicate filenames are not allowed as explained above, this is an indication that the existing transaction is complete because a given transaction does not contain more than one action performed on the same file. Alternatively, if duplicate filenames are allowed up to a maximum number, the program checks whether that maximum has been reached, which also indicates that the transaction is complete. If the transaction is complete, the index file 30 is closed, step 118, and a new index file 30 is created as explained above, steps 120–124.

If the filenames from the record and index file do not match, then the record represents another action in the transaction and an entry is added to the index file 30 containing the filename in the record 20 and a pointer to the record, step 128.

The list of filenames in the index file 30 is then compared to the list of filenames in the selected template 28, step 130. If all the filenames in the selected template 28 are in the index file 30, then the transaction is complete and the index file is therefore closed and deleted, step 132. If not all the filenames in the selected template 28 are in the index file 30, then the transaction may be incomplete, and the next record 20 is retrieved, step 120, and the process continued.

In some embodiments of the invention, users may specify which logs they want to monitor, which templates to monitor against, which jobs to watch for, or whether they prefer all logs, templates or jobs. Users may identify particular monitoring tasks by use of a monitor ID, and then save the parameters such as specific templates or jobs associated with that monitor ID. A monitor ID may also be specified when the transaction monitor program is placed in LEARN mode, which allows users to create a number of specific monitoring tasks. For example, users may want to specify different templates and jobs for use on a daily, weekly, or monthly basis to capture transactions of different types or scope.

Users may suspend or end the monitoring for specific monitoring tasks or specific transactions during transaction monitoring. If monitoring is suspended, the reading of logs and the defining of transactions are suspended but the underlying structures including index files are maintained. Users may then specify that identified held monitoring tasks resume processing.

Also provided in some embodiments is a command for bringing up an interactive display showing a list of all or specified monitoring tasks that have been defined and assigned a monitor ID. From this display, the program contains functionality which allows users to:

(1) display the details of the identified monitor tasks as previously specified by a user, or details that have been modified after submission;
(2) modify the specific monitor details;
(3) stop an identified monitor task;
(4) hold or suspend an identified monitor task while maintaining the underlying structures;
(5) resume a held monitor task; and
(6) display transactions associated with an identified monitor task.

The display transactions function brings up an interactive display which lists all of the current transactions associated with all or specified monitor tasks. This display contains interfaces which allow users to:

(1) display the active details for the templates associated with the transaction. Users will be able to see how many of the files have been found towards the definition of the transaction. Other details regarding time stamps, jobs, etc. are made available;

(2) end a specific transaction and mark it as complete regardless of the partial state of the data within the templates. The transaction is removed as if it were a normal completion of the transaction, i.e., by deleting the associated index file.

(3) recover a specific transaction, which invokes the recovery program for the specific transaction and not necessarily all transactions associated with the monitor task. The process of recovering a transaction is described below with reference to FIG. 7.

Users use the database management system to perform actions on the database. At any point during the transaction identification process, the presence of existing index files 30 are indications of transactions which have started but which may not yet be complete. In the event of a system failure, the recovery program 26 (or the transaction monitor program operating in RECOVER mode, as explained above) can locate transactions which have not yet completed by locating any existing index files 30.

Figure 7:
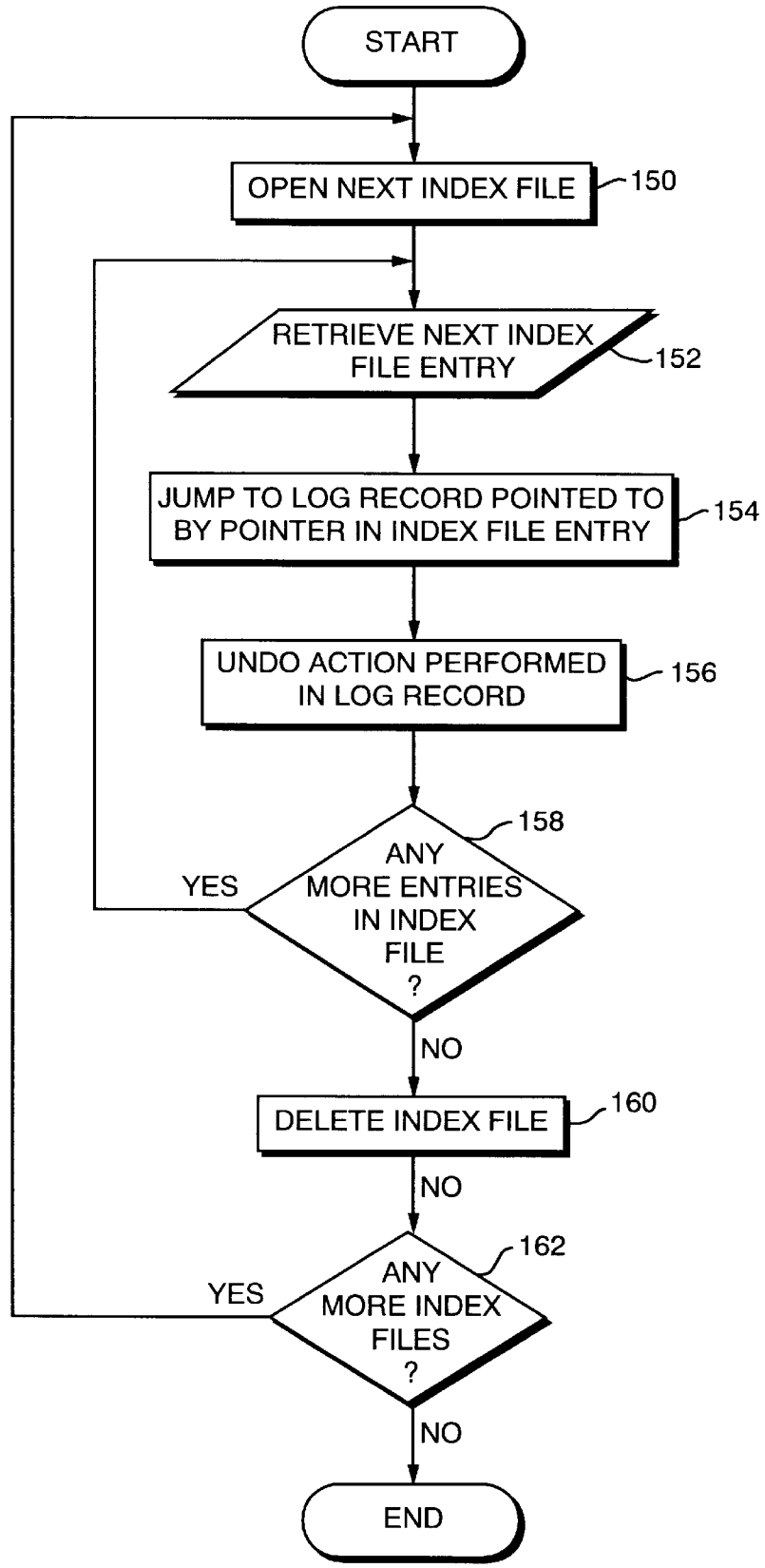
FIG. 7 is a flow chart showing the process of recovering from database failure in accordance with one embodiment of the present invention.

Referring to FIG. 7, each index file 30 existing at the time of system failure is opened, step 150, and each entry in the index file 30 is sequentially retrieved, step 152. The pointer is read and used to jump to the record 20 in the log 18 pointed to by the pointer, step 154. The action specified in the record 20 is undone or rolled back using the data values stored in the log record, as is known in the art. If there are any more entries in the index file, step 158, the process is repeated for each entry; otherwise, the index file is closed and deleted, step 160. If more index files exist, step 162, the process is repeated for the remaining index files.

When all index files have been deleted, any actions performed in the database as part of incomplete transactions have been rolled back, thus protecting the integrity of transactions and the consistency of data in the database.

Aside from the use and operation of the system and program for database recovery as described herein, the system may be used for database locking as well. As will be recognized by those of skill in the art, the index files which represent ongoing transactions may be used to identify records in the log, which in turn may be used to identify database files which are being used as part of transactions. The files can then be locked according to known locking schemes.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of defining transactions from a log of a database, the log comprising data relating to changes to the database, the log data being stored in a plurality of records each having a plurality of fields, the method comprising:

for each of a plurality of records in the log, determining whether the record relates to a transaction included in a transaction template;

for each record that relates to a transaction included in the template, determining whether the record relates to a new transaction or an incomplete transaction;

for each record relating to a new transaction, creating and storing an indicator for the transaction and inserting information relating to the record into the indicator; and for each record relating to an incomplete transaction, determining whether the record represents the end of the incomplete transaction and, if the record does not represent the end of the incomplete transaction, inserting information relating to the record into the previously created indicator for the incomplete transaction.

2. The method of claim 1 comprising storing a plurality of transaction templates and selecting one of the plurality of templates based on at least part of the data stored in the record.

3. The method of claim 2 wherein each template is assigned a key value based on one or more data fields from the database, wherein the data stored in the record includes data values from data fields in the database, and wherein the step of selecting one of the templates comprises selecting a template having a key value which matches one or more of the data fields whose data values are in the record.

4. The method of claim 1 comprising retrieving records from the log, and wherein the steps set forth in claim 1 are performed immediately after retrieving each record from the log.

5. The method of claim 1 wherein the plurality of fields in each record includes a filename field identifying a database file affected by a change, and wherein the template includes a plurality of filenames representing files changed during a transaction, and wherein the step of determining whether each record relates to a transaction included in the template comprises determining whether the filename stored in the record matches a filename in the template.

6. The method of claim 1 further comprising deleting the previously created indicator when the record represents the end of the incomplete transaction.

7. The method of claim 6 wherein the step of determining whether the record relates to a new transaction or an incomplete transaction comprises searching for an indicator containing data which matches data stored in the record, the failure to find such an indicator being an indication that the record relates to a new transaction.

8. The method of claim 7 wherein the data stored in the log records includes job identifier data, wherein the step of inserting information into the indicator comprises inserting the job identifier data from the record into the indicator, and wherein the step of searching for an indicator comprises searching for an indicator containing job identifier data which matches the job identifier data stored in the record.

9. The method of claim 7 wherein the data in each record includes one or more data values from one or more data fields in the database, the one or more data fields being used as a key value for the template, wherein the step of inserting information into the indicator comprises inserting the key value from the record into the indicator, and wherein the step of determining whether the record relates to a new transaction or an incomplete transaction further comprises comparing the key value in the record to a key value stored in the indicator found in the search, the mismatch of key values being an indication that the record relates to a new transaction.

10. The method of claim 7 wherein the plurality of fields includes a filename field representing a database file affected by a change, wherein the step of inserting information into the indicator comprises inserting the filename from the record into the indicator, and wherein the step of determining whether the record relates to a new transaction or an incomplete transaction further comprises comparing the filename in the record to a filename stored in the indicator found in the search, the match of filenames being an indication that the record relates to a new transaction.

11. The method of claim 1 wherein the step of inserting information relating to the record into the indicator for the incomplete transaction is performed if and only if the record does not represent the end of the incomplete transaction.

12. The method of claim 1 wherein the step of inserting information relating to the record into the indicator comprises inserting information pointing to a location of the record in the log.

13. The method of claim 12 wherein the log comprises a plurality of log sequence numbers each associated with a record, and wherein the step of inserting information pointing to the location of the record in the log comprises inserting the log sequence number associated with the record into the indicator.

14. The method of claim 1 comprising, in the event data is lost from or damaged in the database, using the indicators to recover the lost or damaged data.

15. The method of claim 14 comprising deleting the previously created indicator when the record represents the end of the incomplete transaction, and wherein the step of using the indicators to recover the lost or damaged data comprises identifying incomplete transactions based on the indicators and undoing any changes stored in records relating to incomplete transactions.

16. A method of defining transactions from a log of a database based upon a plurality of transaction templates, the log comprising data relating to changes to the database stored in a plurality of records each including a filename field representing a database file affected by a change, job identifier data, and data values from data fields in the database, each template being associated with a key value comprising one or more data fields in the database, each template comprising a plurality of filenames representing files changed during one or more given transactions, the method comprising:

retrieving a log record from the database log;

identifying one of the plurality of templates by comparing the data fields whose data values are stored in the retrieved record to the key values contained in the templates;

searching for an index file containing job identifier data which matches the job identifier data stored in the retrieved record;

if no index file is found having matching job identifier data, creating an index file and inserting information relating to the record into the index file including the job identifier data, key value of the identified template, and filename from the retrieved record;

if an index file is found having matching job identifier data, comparing the key value contained in the found index file with the data fields whose data values are stored in the retrieved record; and if the key value contained in the found index file matches one or more of the data fields whose data values are stored in the retrieved record, inserting information relating to the record into the index file including the filename from the retrieved record.

17. The method of claim 16 comprising, if the key value contained in the found index file does not match one or more of the data fields whose data values are stored in the retrieved record, deleting the found index file, creating a new index file and inserting information relating to the record into the new index file including the job identifier data, key value of the identified template, and filename from the retrieved record.

18. The method of claim 16 comprising comparing the filename stored in the retrieved record to the filenames stored in the template and, if the filename stored in the retrieved record does not match any filename stored in the template, adding the filename stored in the retrieved record to the template.

19. The method of claim 16 comprising, if data is lost from or damaged in the database, using the index files to recover the lost or damaged data.

20. A method of providing transaction protection for a database, wherein actions performed on data within the database are recorded in a log having a plurality of entries each storing at least job identifier data representing a source of a job being performed, a filename representing a file in the database affected by an action, an action performed on data in the database file, and one or more data fields from the database file which comprise a key value, and wherein transactions comprise a plurality of actions performed on a plurality of files, the method comprising:

retrieving entries from the log;

storing at least one template listing filenames which are affected by one or more transactions;

for each retrieved log entry, comparing the filename in the entry to the filenames in the at least one template to determine whether the entry represents part of a transaction; for each entry which represents part of a transaction:

determining based at least in part on the job identifier data whether a transaction is in progress for the job identified by the job identifier data;

if no transaction is in progress for the job, marking the entry as part of a new transaction;

if a transaction is in progress for the job, determining whether the transaction in progress is for the key value stored in the entry and if so, marking the entry as part of the transaction in progress if the filename in the entry has not already been marked in the transaction in progress;

if the transaction in progress is for a key value different than the key value in the entry, or if the filename in the entry has already been marked in the transaction in progress, closing the transaction in progress and marking the entry as part of a new transaction; and in the event of loss or damage to data in the database, undoing any actions represented by entries marked as part of a transaction in progress which has not been closed.

21. A method of creating a transaction template from a log of a database, the log comprising a plurality of records of changes made to the database, the records containing data values associated with data fields in the database, the method comprising:

retrieving the data values from the records and storing the data values;

comparing the data values from a given record with data values from other records;

when one or more data values from the given record match one or more data values from one or more other records, identifying the one or more data fields from the database files associated with the matching one or more data values; and creating a transaction template associated with a key value comprising the identified one or more data fields.

22. The method of claim 21 wherein the database comprises a plurality of tables, wherein each log record contains a name of a table in the database affected by a change to the database, and wherein the table names from records having one or more matching data values are stored in the transaction template associated with the key value.

23. The method of claim 22 comprising displaying the table names stored in the transaction template and modifying the table names based on input received from the user.

24. The method of claim 21 comprising displaying the key value to a user and modifying the key value based on input received from the user.

25. A method of providing transaction protection for a database comprising:

creating a plurality of transaction templates each comprising a plurality of filenames identifying files in the database affected during a transaction and a key value representing one or more data fields in the database included in every action performed during the transaction;

for each of a plurality of entries in a log of the database, determining whether the entry belongs to a transaction based on the data in the entry and the key values associated with the templates;

maintaining index files representing transactions in progress by creating a new index file for each new transaction, adding data to a given index file from a log entry which belongs to the transaction associated with the given index file, and deleting index files when transactions with which they are associated are complete; and in the event the database is damaged, using existing index files to determine at least which transactions did not complete before the database was damaged.

26. For use with a database manager program in which a log of database operations is maintained having a plurality of records each representing an action performed on the database, a system for providing externally defined transaction protection to a database, the system comprising:

means for retrieving records from the log;

a plurality of transaction templates each containing information representing one or more types of transactions;

first comparison means for determining based on the information contained in the templates whether each log record is part of a type of transaction;

second comparison means for indicating which records are part of transactions in progress;

means for, in the event of computer system failure or damage, undoing any actions performed on the database as represented by records which are part of transactions in progress.

27. A computer usable medium having computer readable program code embodied in said medium for causing the computer to perform method steps for creating a transaction template from a log of a database, the log comprising a plurality of records of changes made to the database, the records containing data values associated with data fields in the database, the method steps comprising:

retrieving the data values from the records and storing the data values;

comparing the data values from a given record with data values from other records;

when one or more data values from the given record match one or more data values from one or more other records, identifying the one or more data fields from the database files associated with the matching one or more data values; and creating a transaction template associated with a key value comprising the identified one or more data fields.

28. A computer usable medium having computer readable program code embodied in said medium for causing the computer to perform method steps for defining transactions from a log of a database, the log comprising data relating to changes to the database, the log data being stored in a plurality of records each having a plurality of fields, the method steps comprising:

for each of a plurality of records in the log, determining whether the record relates to a transaction included in a transaction template;

for each record that relates to a transaction included in the template, determining whether the record relates to a new transaction or an incomplete transaction;

for each record relating to a new transaction, creating and storing an indicator for the transaction and inserting information relating to the record into the indicator; and for each record relating to an incomplete transaction, determining whether the record represents the end of the incomplete transaction and, if the record does not represent the end of the incomplete transaction, inserting information relating to the record into the previously created indicator for the incomplete transaction.

* * * * *